(12) United States Patent
Matheny

(10) Patent No.: US 7,410,342 B2
(45) Date of Patent: Aug. 12, 2008

(54) AIRFOIL SUPPORT

(75) Inventor: Alfred P. Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 517 days.

(21) Appl. No.: 11/206,527

(22) Filed: Aug. 18, 2005

(65) Prior Publication Data

US 2007/0243070 A1    Oct. 18, 2007

Related U.S. Application Data

(60) Provisional application No. 60/677,899, filed on May 5, 2005.

(51) Int. Cl.
*F01D 9/04* (2006.01)
*F01D 9/06* (2006.01)
*F01D 5/14* (2006.01)
*F01D 5/18* (2006.01)

(52) U.S. Cl. .................... 415/115; 415/200; 415/209.4; 415/210.1; 416/92; 416/97 R; 416/224; 416/226; 416/230; 416/241 A; 416/241 B; 29/419.1; 29/889.71; 29/889.721; 29/889.722

(58) Field of Classification Search ................ 415/115, 415/191, 200, 208.1, 208.2, 209.3, 209.4, 415/210.1; 416/92, 96 R, 96 A, 97 R, 224, 416/225, 226, 229 A, 230, 241 A, 241 B; 29/419.1, 889.7, 889.71, 889.72, 889.721, 29/889.722

See application file for complete search history.

(56) References Cited

U.S. PATENT DOCUMENTS

| 2,479,057 | A |   | 8/1949  | Bodger                      |
|-----------|---|---|---------|-----------------------------|
| 3,844,728 | A |   | 10/1974 | Copley et al.               |
| 4,247,259 | A | * | 1/1981  | Saboe et al. ........ 416/241 B |
| 4,249,291 | A |   | 2/1981  | Grondahl et al.             |
| 4,285,634 | A |   | 8/1981  | Rossman et al.              |
| 4,314,794 | A |   | 2/1982  | Holden et al.               |
| 4,563,125 | A | * | 1/1986  | Boudigues et al. ...... 415/115 |
| 4,563,128 | A |   | 1/1986  | Rossmann                    |
| 4,790,721 | A |   | 12/1988 | Morris et al.               |
| 4,859,141 | A | * | 8/1989  | Maisch et al. .......... 415/115 |
| 6,514,046 | B1 |  | 2/2003  | Morrison et al.             |

* cited by examiner

*Primary Examiner*—Christopher Verdier
(74) *Attorney, Agent, or Firm*—John Ryznic

(57) ABSTRACT

A blade or a vane preferably used in a gas turbine engine, the blade or vane being formed of a metallic core or insert with a ceramic airfoil surface bonded to the metallic insert. The insert includes a series of concave and convex portions arranged along the outer surface, in which a plurality of hoop fibers are secured within a resin matrix to firmly secure the metallic insert to the ceramic airfoil body. Axial loads between the insert and the ceramic body are transferred to the hoop fibers. The hoop fibers are strong enough to resist extending in length that would permit the hoop fibers from sliding over the widest portion of the insert.

17 Claims, 2 Drawing Sheets

AIRFOIL SUPPORT

CROSS-REFERENCE TO RELATED APPLICATIONS

This application claims the benefit to a US Provisional Application No. 60/677,899 filed on May 5, 2005.

BACKGROUND OF THE INVENTION

1. Field of the Invention

This Invention relates to the field of Gas Turbine Engines, and, generally to airfoils and, more particularly, to ceramic turbine airfoils with a metal internal support structure.

2. Description of the Related Art including information disclosed under 37 CFR 1.97 and 1.98

Gas Turbine Engines include a turbine with a plurality of rows of rotating blades and stationary vanes, or airfoils. Airfoils are generally made hollow, with air cooling passages therein to provide cooling for the airfoil. The external surfaces of the airfoil are subjected to high temperatures from the flowing gas. Cooling a turbine airfoil prolongs the turbine airfoil useful life and improves turbine airfoil performance.

A hollow airfoil may have a metal insert secured within the airfoil by a resin matrix, possibly including a fibrous material embedded within the matrix. One problem with the prior art is that the metal material of the insert does not bond well to the resin matrix. With a weak bond, the insert can slide out of the hollow airfoil under light loads.

FIG. 1 show a helicopter blade 20 secured to a rotor of a driving engine. The rotor includes a blade mounting portion 10 having an annular recess 12 formed completely around the shaft of the blade mounting portion. The blade includes fingers 22 extending inward and toward the annular recess of the mounting portion 10. Each finger 22 includes a hoop fiber arrangement 30 extending in an annular arrangement around the fingers 22. The hoop fibers 30 form a bump portion extending inward from the fingers 22 and align with the annular recess 12 formed in the blade-mounting portion 10. The hoop fibers 30 are formed within a resin matrix, forming a fibrous composite material. Because of the strength of the fibers within the matrix, the blade is securely attached to the rotor mount even under the extremely high centrifugal forces developed during high-speed rotation of the blades about the rotor. In order for the blade to slip out of the blade mount, the fibers would have to break.

FIG. 2 shows an airfoil known in the prior art and shown in U.S. Pat. No. 4,249,291. A plurality of holes 24 are drilled in an oversized airfoil core blank 25 at spaced locations corresponding to the desired locations of cooling tubes in the airfoil. The cooling tubes are separately fabricated as preassembled composite tube inner member 27 within an outer member 26 and are inserted into the holes 24 formed in the airfoil blank 25. The so-inserted composite tubes 27 are then HIP diffusion bonded or brazed in place.

U.S. Pat. No. 4,563,128 issued to Rossmann on Jan. 7, 1986 shows a Ceramic turbine Blade Having A Metal Support Core in which a hollow ceramic blade member is supported between flanges on a metal core, or by a core head attached at an end of a metal rod passing though a hollow portion of the ceramic blade.

U.S. Pat. No. 4,790,721 issued to Morris et al on Dec. 13, 1988 shows a Blade Assembly in which a ceramic blade jacket is supported on a metallic core between a lower flange extending from a root of the blade and a top flange formed on the metallic core.

U.S. Pat. No. 4,314,794 issued to Holden, deceased et al on Feb. 9, 1982 shows a plurality of hollow ceramic washers in the shape of a blade supported on a metal core, a bolt securing the metal core to a ceramic root portion of the blade.

U.S. Pat. No. 4,285,634 issued to Rossmann et al on Aug. 25, 1981 shows a gas turbine blade constituted of a supportive metallic blade core and a thin-walled ceramic blade airfoil, in which the airfoil is supported against a tip plate of the blade core. The blade core consists of rod or wire-shaped pins which have widened bases at their radially inner ends. Through these widened bases, the pins are retained in a metallic adapter slidably into a turbine disc.

U.S. Pat. No. 2,479,057 issued to Bodger on Aug. 16, 1949 shows a ceramic blade secured to a metallic post by a shroud segment welded to the metallic post, the shroud segment forming a flange to hold the ceramic blade onto the metallic post.

U.S. Pat. No. 6,514,046 issued to Morrison et al on Feb. 4, 2003 shows a vane assembly for a turbine assembly includes an inner end cap, an outer end cap, and a body. The body includes a metallic core assembly, a ceramic shell assembly and a support assembly. The metallic core assembly is coupled to the inner and outer end caps and bears most of the mechanical loads, including aerodynamic loads. The ceramic shell bears substantially all of the thermal stress placed on the vane assembly. The support assembly is disposed between the metallic core assembly and said ceramic shell assembly and is coupled to the metallic core assembly.

The above cited prior art references do not have strong bond between a metallic insert and a blade or vane body made of a ceramic material that can withstand modern high stresses in the airfoil that tend to separate the metallic material from the ceramic material.

It is therefore an object of the present invention to provide a high strength bond between a metallic insert and an outer ceramic airfoil member, the airfoil being a blade or vane used in a gas turbine engine.

BRIEF SUMMARY OF THE INVENTION

The objective of the invention is accomplished by providing for the metal insert to have an outer surface formed with concave portions arranged annularly around the insert. Composite material (49, 50) is wrapped around the metal insert to form a mechanical locking means between the contoured metal insert structure 45 and the composite structure (45, 50). In order to improve the mechanical trap between the metal inserts and the composite material, the fibers can be hoop wound to increase the composite interlocking strength. The metal insert is contoured so that the fibers would have to be broken in hoop tension before the parts can separate, thus forming a strong attachment that does not rely on a weak metal-to-composite bond. The external airfoil member 44 can be made of a composite material and, thus, made integral with the internal composite material (45, 50). This allows the composite material to be trapped to a metal insert without relying on conventional bonding. Conventional bonding has the disadvantage of breaking when exposed to thermals because of thermal mismatch between the metal and composite and/or ceramic structure.

The airfoil has a leading edge and a trailing edge, and a pressure side and a suction side extending between the leading edge and the trailing edge. The fibers are high temperature resistant fibers capable of use within a gas turbine engine environment.

DETAILED DESCRIPTION OF THE INVENTION

Figure 1:
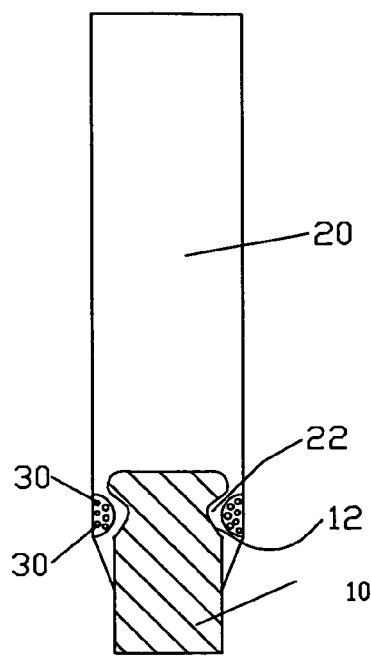
FIG. 1 shows a helicopter blade secured to a rotor of a driving engine and secured thereto by hoop fibers in the prior art.
Figure 2:
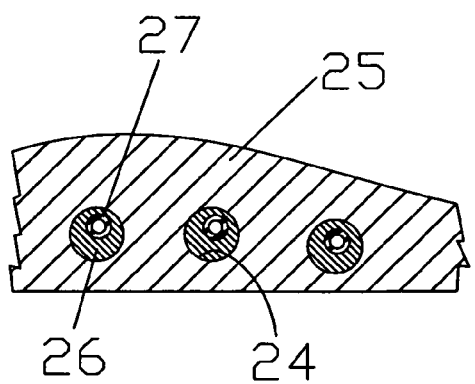
FIG. 2 shows the Prior Art airfoil of the Grondahl et al U.S. Pat. No. 4,249,291 showing cooling tubes secured within holes in an airfoil.
Figure 3:
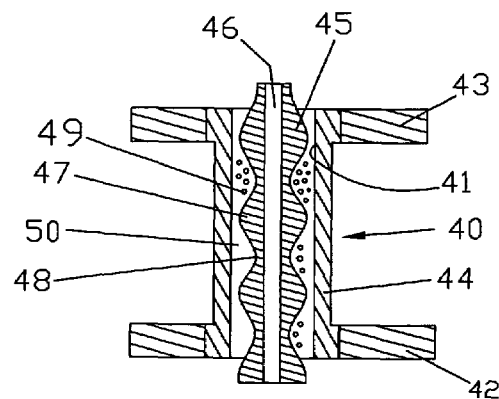
FIG. 3 shows a cross sectional view of a hollow vane and insert of the present invention.

The instant invention is best seen in FIG. 3 which shows a stationary vane 40, but the invention can be applied just the same to a rotating blade or any other airfoil type blade, such as in a propeller or wind vane. The vane 40 includes an inner shroud 42 and an outer shroud 43, and an airfoil portion 44 located between the two shrouds. The airfoil portion 44 is made of a ceramic material.

Within the airfoil 40 is a hollow metal insert 45 having a cooling fluid passage 46. The outer surface of the insert 45 is formed of alternating convex 47 and concave 48 portions. Hoop fibers 49 are arranged in the concave portion 48 to form an annular ring. The hoop fibers 49 consist of one or more long fibers that wrap around the metal insert to from the annular ring. The hoop fibers 49 are located substantially within the concave portions 48 of the metallic insert 45 in order to provide the maximum strength for the fiber reinforced of composite material that binds the airfoil to the insert. Some of the hoop fibers 49 can be arranged outside the concave portion 48 and still provide for the strength that the fibers produce within the matrix that forms the fiber reinforced composite material. The number of fibers in the ring would depend upon the tensile strength of the fiber and the number of fibers formed within a concave portion of the metal insert. The more fibers, the stronger the ring arrangement.

With the hoop fibers 49 in place, the insert 45 is inserted into the hollow airfoil 40, and the resin matrix 50 is applied. The matrix 50 bonds to the fibers and to the inner surface 41 of the hollow ceramic or composite vane 40. The matrix also bonds to the outer surface of the insert 45. The matrix 50 substantially fills the space between the outer surface of the metal insert 45 and the inner surface 41 of the hole in the vane or blade such that the airfoil is secured against displacement from the insert 45. The high strength bond between the matrix and the outer surface of the metal insert is due to the hoop fibers 49 being secured within the matrix 50 and the concave portions 48 of the insert. In order for the insert 45 to slide out of the resin matrix 50, the hoop fibers 49 would have to be stretched to a point that the diameter of the annular ring of fibers is larger than the diameter of the convex portion 47 of the outer surface of the insert 45. Because the tensile strength of the fibers are so great, and extremely large force is required to pull the insert out of the hollow airfoil.

Figure 4:
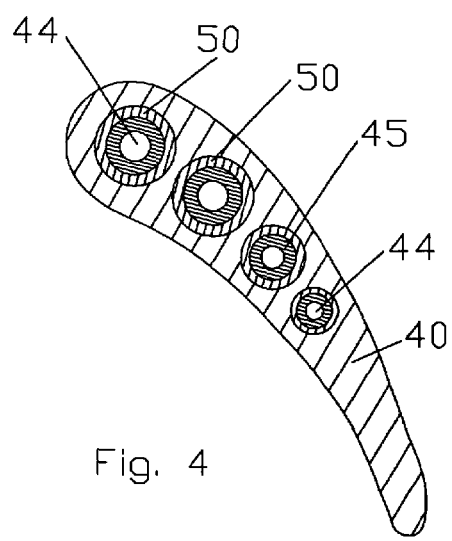
FIG. 4 shows a cross sectional view of the airfoil of the instant invention from a top view.

FIG. 4 shows a cross-section of a vane in which a plurality of inserts 45 is secured within the vane 40. Each insert 45 includes a plurality of the concave portions described above in which plurality of hoop fibers form an annular ring and are embedded within a resin matrix 50.

Figure 5:
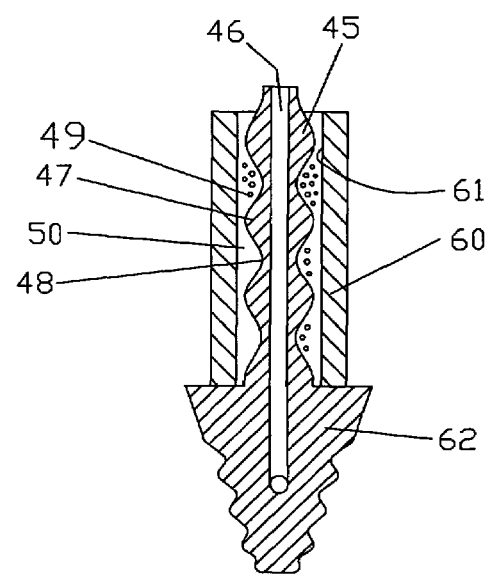
FIG. 5 shows a cross sectional view of hollow blade and insert of the present invention.

FIG. 5 shows a cross section view of a second embodiment of the present invention, in which a blade includes the hollow insert secured to the blade body by the hoop fibers embedded in the resin matrix. A hollow blade body 60 is similar in function to the hollow vane body 44 in the FIG. 3 embodiment. The hollow blade body 60 includes an inner surface 61 on which the resin matrix material bonds to secure the hollow blade to the metal insert 45. the metal insert 45 includes the series of concave and convex portions as in the FIG. 3 vane, with the hoop fibers 49 embedded in the resin matrix 50 to form the high strength bond between the inner surface 61 of the ceramic blade and the outer surface of the metal insert.

The process of forming the blade or vane according to the above described apparatuses will be described below. A metallic insert is formed with a series of alternating concave and convex portions on the outer surface thereof. The ceramic airfoil —which can be a blade or a vane—has at least one hole formed therein in which the insert can be placed with enough room to fill the space with a matrix material. The fibers are wrapped around the insert in the concave portions to produce a number of hoop fibers that wrap around the insert. The insert with the fibers wrapped around is then inserted into the hole in the airfoil. The space formed between the inner surface of the hole and the outer surface of the insert is then filled with a matrix material so that the fibers are adequately covered by the matrix material to form the fiber reinforced composite material to secure the metallic insert to the ceramic airfoil. Prior to placing the fibers around the cooling fluid through the insert when the insert is secured to the airfoil. If the airfoil is a stator vane, then the inner and the outer platforms are formed and the vane airfoil is secured to the platforms to form the flow path through the vane. The metallic insert is then inserted into the hole within the vane airfoil and the two platforms with the fibers wrapped around the concave portions prior to filling the space with the matrix material. If the airfoil is a rotor blade, then the insert has a fir tree or dove tail root formed on the root end of the insert so that the composite blade can be inserted into a slot on a rotor disk.

I claim the following:

1. An airfoil, comprising:
   a metallic insert having an outer surface forming a plurality of concave portions and a plurality of convex portions around its outer surface;
   a ceramic airfoil having a hollow section, the metallic insert fitting within the hollow ceramic airfoil;
   a resin matrix material substantially filling a space formed between an inner surface of the ceramic airfoil and the outer surface of the metallic insert; and,
   a plurality of hoop fibers embedded into the resin matrix and located substantially within the concave portions of the metallic insert.

2. The airfoil of claim 1, and further comprising:
   the ceramic airfoil includes inner and outer shrouds extending from the airfoil portion to form a vane.

3. The airfoil of claim 1, and further comprising:
   the metallic insert includes a cooling fluid passage extending through the insert.

4. The airfoil of claim 1, and further comprising:
   the insert includes a root member to form a blade, the root member including means to secure the root to a slot in a rotor disc.

5. A process for forming an airfoil comprising the steps of:
   forming a metallic insert having a series of concave and convex portions on the outer surface of the insert;
   placing a plurality of fiber hoop members within the concave portions of the insert;
   placing the insert with the hoop fibers within a hollow portion of a ceramic airfoil; and, filling the space formed between the inner surface of the hollow portion of the ceramic airfoil and the outer surface of the insert to secure the hoop fibers.

6. The process for forming the airfoil of claim 5, and further comprising the step of:
forming a cooling passage extending through the insert.

7. The process for forming the airfoil of claim 5, and further comprising the step of:
forming an inner shroud and an outer shroud on the ceramic airfoil to form a vane.

8. The process for forming the airfoil of claim 5, and further comprising the step of:
forming a root portion of the insert to form a blade, the root portion having means to secure the blade to a slot in a rotor disc.

9. A ceramic and metallic airfoil for use in a gas turbine engine, the ceramic and metallic airfoil comprising:
an airfoil having a leading edge and a trailing edge, and a pressure side and a suction side extending between the leading edge and the trailing edge;
the airfoil being formed from a high temperature resistant ceramic material;
a metallic insert, the insert having an outer surface forming a concave surface;
a plurality of fibers wrapping around the metallic insert within the concave surface; and,
a resin matrix filling a space formed between an inner wall of the ceramic airfoil and the outer surface of the metallic insert to provide for a bond between the ceramic airfoil and the insert and to hold the fibers in place within the concave surface.

10. The ceramic and metallic airfoil of claim 9, and further comprising:
the metallic insert includes a plurality of concave surfaces each with a plurality of fibers wrapping around the insert.

11. The ceramic and metallic airfoil of claim 9, and further comprising:
the concave surface is formed around the entire insert.

12. The ceramic and metallic airfoil of claim 9, and further comprising:
the fibers are high temperature resistant fibers capable of use within a gas turbine engine environment.

13. The ceramic and metallic airfoil of claim 9, and further comprising:
the metallic insert includes a cooling fluid passage extending though the insert.

14. The ceramic and metallic airfoil of claim 9, and further comprising:
the fibers are one or more long fibers that wrap around the insert a number of times to form a plurality of hoop fibers.

15. The ceramic and metallic airfoil of claim 9, and further comprising:
the airfoil includes a plurality of holes extending in the airfoil spanwise direction; and,
a metallic insert extending through each of the plurality of holes, each insert having a concave outer surface with a plurality of hoop fibers held within the concave surface and wrapping around the insert.

16. The ceramic and metallic airfoil of claim 9, and further comprising:
the airfoil is a turbine rotor blade; and,
the metallic insert includes a root portion with a fir-tree configuration for inserting the blade into a slot within a rotor disk of the turbine.

17. The ceramic and metallic airfoil of claim 9, and further comprising:
the airfoil is a turbine stator vane; and,
the metallic insert is secured between an inner shroud and an outer shroud to form a hot gas path through the stator vane.

* * * * *